No. 693,631. Patented Feb. 18, 1902.
C. L. TILDEN & E. J. BENDER.
MACHINE FOR MOLDING POPCORN BALLS.
(Application filed July 20, 1901.)

(No Model.) 4 Sheets—Sheet 1.

WITNESSES.
E. G. Staude
Richard Paul.

INVENTORS
CRAIG L. TILDEN.
EDWARD J. BENDER.
BY Paul & Hawley
THEIR ATTORNEYS.

THE NORRIS PETERS CO., PHOTO-LITHO., WASHINGTON, D. C.

No. 693,631. Patented Feb. 18, 1902.
C. L. TILDEN & E. J. BENDER.
MACHINE FOR MOLDING POPCORN BALLS.
(Application filed July 20, 1901.)
(No Model.) 4 Sheets—Sheet 2.
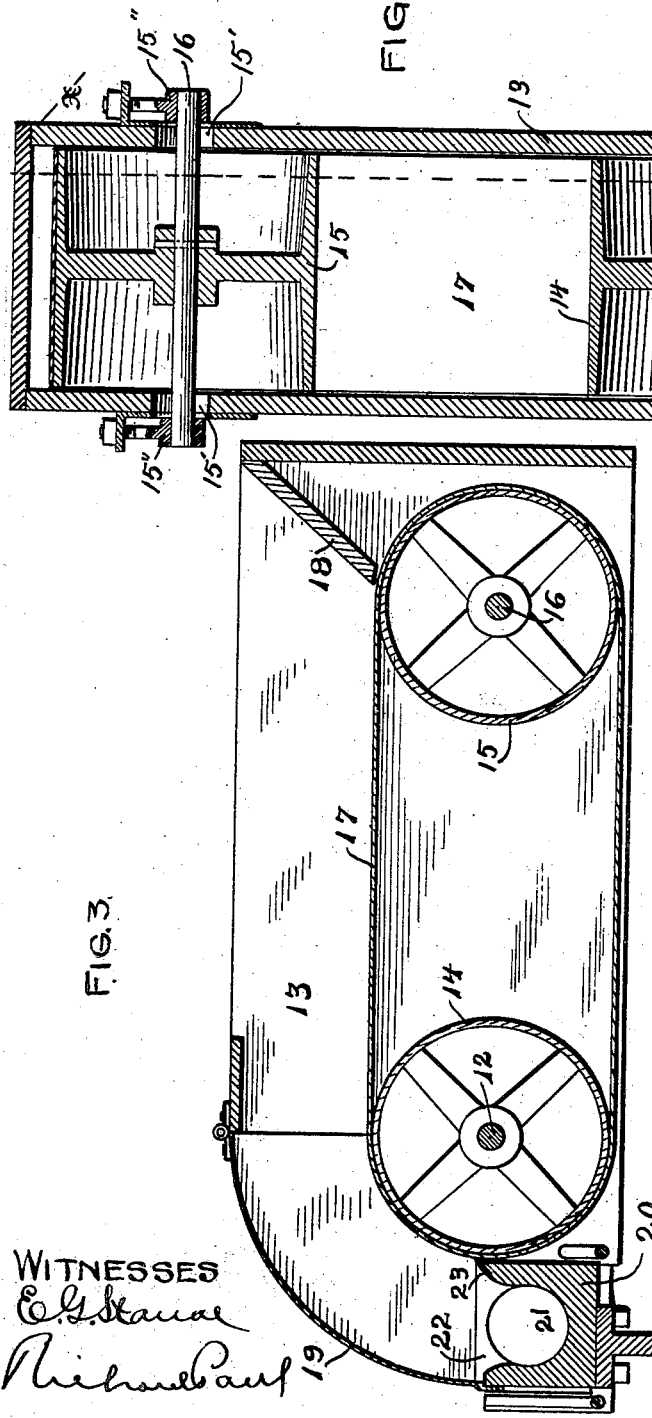
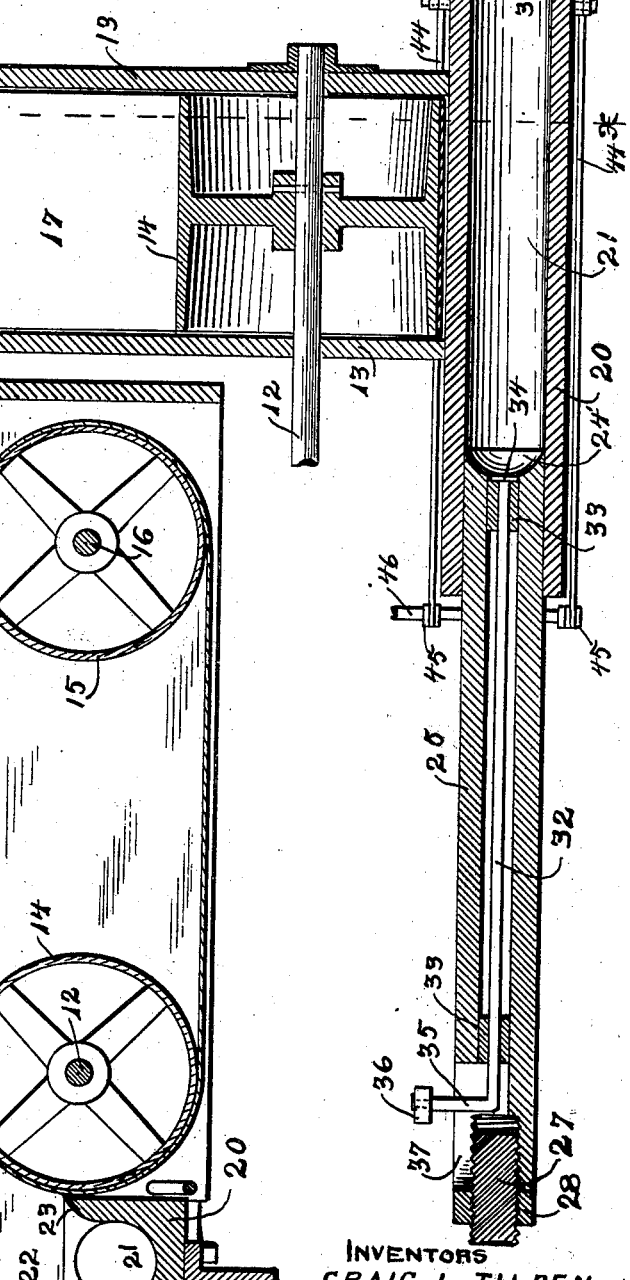
WITNESSES
INVENTORS
CRAIG L. TILDEN
EDWARD J. BENDER
BY
THEIR ATTORNEYS No. 693,631. Patented Feb. 18, 1902.
C. L. TILDEN & E. J. BENDER.
MACHINE FOR MOLDING POPCORN BALLS.
(Application filed July 20, 1901.)
(No Model.) 4 Sheets—Sheet 3.
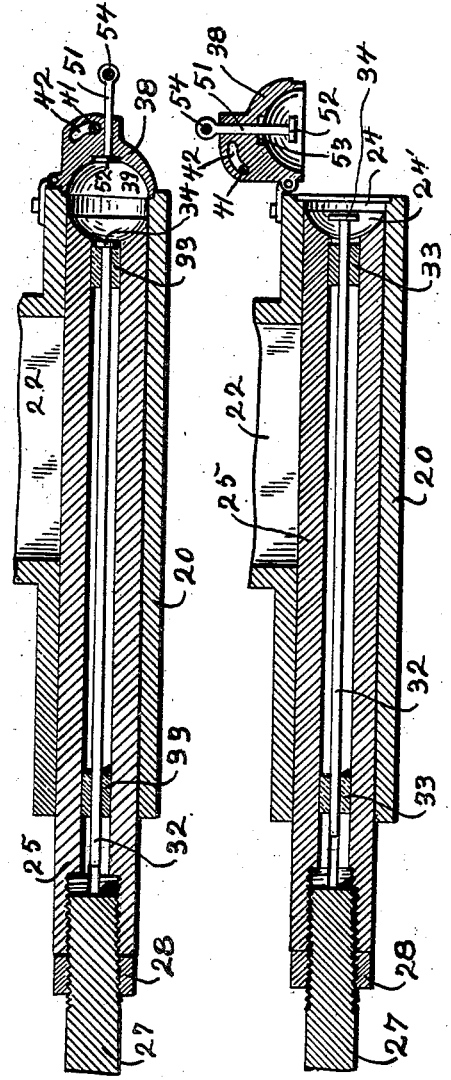
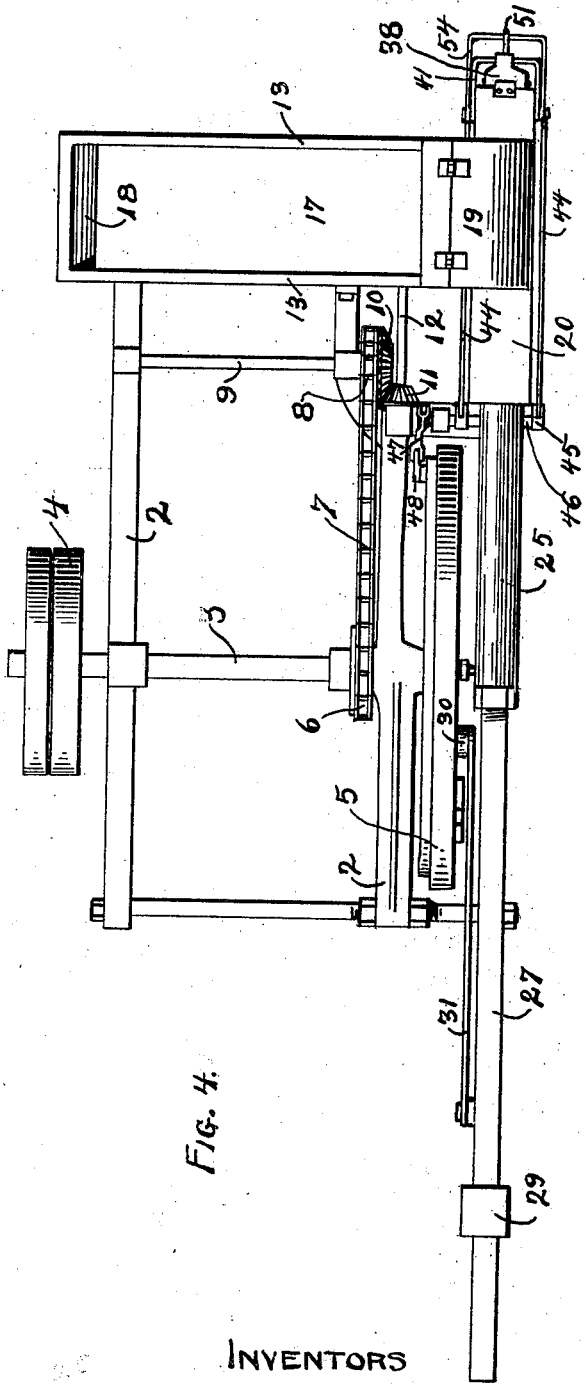
WITNESSES
INVENTORS
CRAIG L. TILDEN.
EDWARD J. BENDER.
BY
THEIR ATTORNEYS.

No. 693,631.  
Patented Feb. 18, 1902.
C. L. TILDEN & E. J. BENDER.
MACHINE FOR MOLDING POPCORN BALLS.
(Application filed July 20, 1901.)

(No Model.)  
4 Sheets—Sheet 4.

WITNESSES  
E. G. Staude  
Richard Paul

INVENTORS  
CRAIG L. TILDEN  
EDWARD J. BENDER  
BY Paul H. Hawley  
THEIR ATTORNEYS.

UNITED STATES PATENT OFFICE.

CRAIG L. TILDEN AND EDWARD J. BENDER, OF MINNEAPOLIS, MINNESOTA.

MACHINE FOR MOLDING POPCORN-BALLS.

SPECIFICATION forming part of Letters Patent No. 693,631, dated February 18, 1902.

Application filed July 20, 1901. Serial No. 69,011. (No model.)

*To all whom it may concern:*

Be it known that we, CRAIG L. TILDEN and EDWARD J. BENDER, of Minneapolis, Hennepin county, Minnesota, have invented certain new and useful Improvements in Machines for Molding Popcorn-Balls, of which the following is a specification.

The invention relates to molding or forming machines; and the object of the invention is to provide a machine wherein popcorn balls or cakes can be more easily and rapidly molded and compressed than by the means ordinarily employed for this purpose.

A further object is to provide a machine in which balls of more uniform size and shape can be formed.

Other objects of the invention will appear from the following detailed description.

The invention consists generally in a barrel having feed and discharge openings, in combination with a molding or forming plunger and a cap normally closing the discharge-opening and coöperating with the plunger to form the ball, said cap being intermittently operated to uncover the discharge-opening and permit the ejectment of the ball when completed.

Further, the invention consists in various constructions and combinations, all as hereinafter described, and particularly pointed out in the claims.

Figure 1:
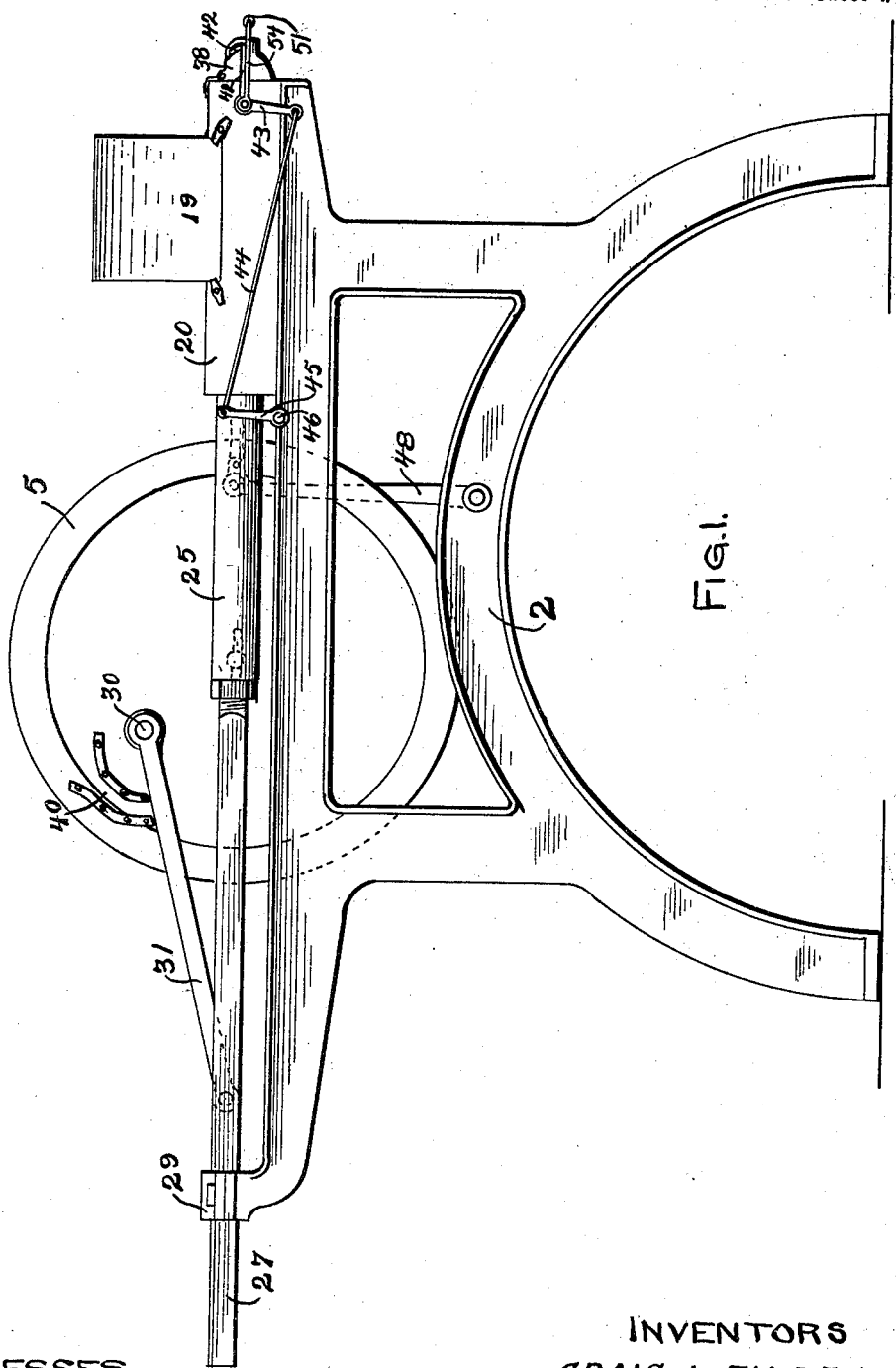
Figure 7:
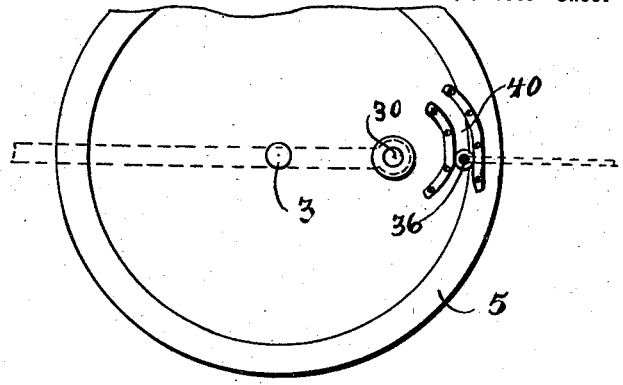
Figure 8:
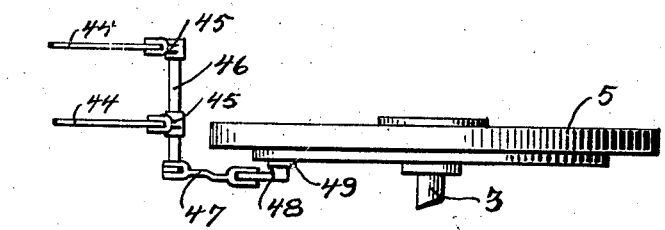
Figure 9:
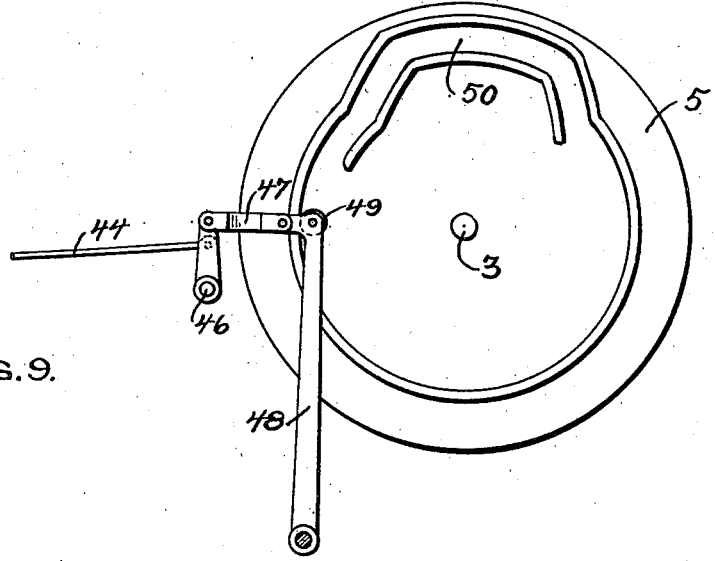

In the accompanying drawings, forming part of this specification, Figure 1 is a side elevation of a machine embodying our invention. Fig. 2 is a horizontal section of the upper portion of the machine. Fig. 3 is a section on the line *x x* of Fig. 2. Fig. 4 is a plan view of the machine. Fig. 5 is a sectional view of the barrel and plunger, showing the position of the latter when compressing the ball. Fig. 6 is a similar view showing the discharge-opening of the barrel open to permit the discharge of the completed ball. Fig. 7 is a detail of the mechanism for operating the relieving or discharging plunger in the plunger proper. Fig. 8 is an edge view showing the mechanism for operating the discharge-opening cap. Fig. 9 is a side elevation of the same.

In the drawings, 2 represents a frame whereon the operating parts of the machine are supported.

3 is a driven shaft provided with a driven pulley 4 and with a comparatively large flywheel 5. A sprocket 6, mounted on the shaft 3, is connected by chains 7 with a similar sprocket 8 on the counter-shaft 9. A beveled gear 10 on the shaft 9 meshes with a correspondingly-shaped pinion 11 on a shaft 12, all of said shafts being mounted in suitable bearings on the machine-frame. The shaft 12 projects through the wall of a casing 13 and is provided therein with a pulley 14, that is connected with a similar pulley 15 on a short shaft 16 by means of a belt 17, that forms the feeding means for the corn and is made of thin metal, preferably brass, and has a smooth glossy surface to prevent as far as possible the molasses from adhering thereto. The ends of the shaft 15 project through slots 15' in the walls of the casing and are provided with adjustable devices 15", by means of which the pulleys may be moved toward or from one another and the tension of the belt increased or diminished. A board 18 in the end of the casing extends down near the belt above the pulley 15 and prevents the corn from slipping down to the the bottom of the casing. The edges of the belt form close joints with the walls of the casing to prevent leakage of the corn, and above the casing a suitable hopper (not shown) is provided, wherein a quantity of corn mixed with the cooked molasses is placed and falling upon the feed-belt is carried into the molding and compressing mechanism of the machine. A hood 19, hinged to the walls of the casing, normally covers the discharge end of the belt and prevents dust and dirt or insects from entering the molding-chamber, but at the same time permits access to the feed-belt for repairs or for cleaning purposes.

Near the discharge end of the feed-belt we provide a barrel 20, having a cylindrical chamber 21, wherein the corn to be made into balls or cakes is discharged from the feed-belt through a receiving-opening 22. Beneath the receiving-opening we prefer to provide a thin blade 23, whose edge is near the surface of the feed-belt and is adapted to keep the surface of the belt free from accumulations of molasses and corn that may stick thereto. The barrel has an open end 24, and within said barrel we provide a longitudinally-slidable plunger 25, having a cup-shaped recess 24' in its inner end and threaded at its outer end to receive the threaded end of a plunger-rod 27, that is locked in said plunger by a nut 28. The plunger-rod slides in a guide 29 on the machine-frame and is connected with a wrist-pin 30 on the fly-wheel by a pitman 31. The plunger 25 is hollow, and arranged therein is an auxiliary or discharging plunger 32, slidable in bushing-blocks 33 and provided at its inner end with a flat head or cap 34 and at its outer with a lateral extension 35, that projects through a slot 37 in the wall of the plunger and is provided with an antifriction-roller 36. When in its normal position, the head 34 bears upon the adjacent bushing-block and is substantially flush with the bottom of the cup-shaped recess 24'. Over the discharge-opening in the end of the barrel we prefer to provide a cap or cover 38, that is preferably hinged to the upper side of the barrel and is provided with a cup-shaped recess 39, wherein a portion of the ball is forced by the movement of the plunger. The recessed inner end of the plunger will be near the discharge-opening of the barrel when the plunger is at the limit of its inward stroke, and the coöperation of the plunger and cap will cause the corn between them to be molded in the form of a ball and compressed during the last part of the stroke of the plunger. Upon the surface of the fly-wheel we provide a cam-groove 40, in which the roller 36 enters when the ball has been formed and compressed, so that just before the plunger completes its inward stroke the auxiliary or discharging plunger will be operated to force the ball of corn out of the cup-shaped recess in the end of the plunger. In order that the cap covering the discharge-opening may be opened at just the right time to allow the completed corn-ball to be ejected, we provide a U-shaped rod 41, that passes through a slot 42 in the cap and is slidable therein and is pivoted on each side of the barrel. This rod is provided at each end with depending arms 43, that are pivotally connected by rods 44 with crank-arms 45 on a shaft 46. This shaft extends beneath the plunger transversely with respect thereto and is pivotally connected by a link 47 with an arm 48, that carries an antifriction-roller 49, that is adapted to move over the inner face of the fly-wheel and travel in a cam-groove 50 thereon. The arm 48 extends down below the fly-wheel and is pivoted on the machine-frame. The cam-groove 50 is so arranged on the face of the wheel that the antifriction-roller 49 will enter therein just at the moment the corn-ball is compressed and molded, so that through the medium of the rock-shaft 46 and its connection the cap covering the discharge-opening will be quickly opened, permitting the discharge of the completed corn-ball. In addition to the relieving or discharging plunger provided in the plunger proper we prefer to provide one in the cap 38, that is adapted to force the corn-ball out of the cup-shaped recess therein. This plunger consists of a rod 51, having a flat head 52, that normally lies within a recess 53 in the bottom of the cup-shaped recess, said rod being connected at its outer end to a U-shaped rod or member 54, whose ends have common pivots with the rod 41. As heretofore described, the cap is hinged to the barrel on the upper side of the discharge-opening, and the U-shaped rod 41 is slidable in the curved slot in said cap when it is being opened or closed, and the U-shaped rod 54 being on a different center from the pivotal supports of the cap will be drawn in as the cap is opened, causing the rod 51 to slide inward, pushing the flat head 52 out of its recess and ejecting the completed corn-ball.

In operation the corn mixed with the cooked molasses is fed into the barrel by the feed-belt, and the reciprocating plunger coöperating with the cap over the discharge-opening of the barrel will quickly compress the corn into the shape of a ball, and with each revolution of the fly-wheel and each stroke of the plunger a ball of corn will be molded and compressed and when completed ejected from the machine through the discharge-opening in the barrel, the cap having previously been automatically opened for that purpose. The barrel, plunger, and cap are all preferably of brass, as it is easily kept clean, will not rust, and can be finished to present a smooth surface to which the corn and molasses will not readily adhere. The U-shaped rod 41 in its normal position passes across the cap near its center and has a firm bearing thereon, so that the shock of the plunger will not disturb the cap until it is released by the mechanism connected therewith. As soon, however, as the rod 41 swings on its pivot away from its bearing-surface on the cap the latter may be swung open easily and the completed ball ejected. As soon as the ball has been ejected the plunger will begin its return stroke, and the discharging or relieving plunger carried thereby will, through the medium of the cam-groove and the antifriction-roller engaged thereby, be returned to its normal position ready to be projected again upon the next revolution of the fly-wheel. The swinging cap will as soon as the plunger begins its return stroke be swung down over the discharge-opening through its connections with the cam-groove on the opposite side of the fly-wheel from the plunger, and the U-shaped rod swinging down with the cap and sliding in the groove therein will when it reaches its normal position over the center of the cap lock the same securely over the discharge-opening.

In case it is desired to mold a flat cake of corn we may substitute a plunger having a square face and a cap having a corresponding face to coöperate therewith. The discharging-plungers will be employed with this form of cap and plunger and operated in substantially the same way as with the recessed form heretofore described. The modified form of plunger and cap described may be readily substituted at any time in place of those having recessed faces, so that the machine is capable of molding or forming corn balls or cakes as may be required.

Having thus described our invention, we claim as new and desire to secure by Letters Patent—

1. In a machine for making corn-balls, the combination, with a barrel having corn receiving and discharge openings, of a reciprocating plunger, a hinged cap normally closing said discharge-opening and coöperating with said plunger to compress and form the ball, and means for intermittently operating said cap to uncover said discharge-opening and allow the ejectment of a ball, substantially as described.

2. In a machine for making corn-balls, the combination, with a barrel having corn receiving and discharge openings, of a reciprocating plunger having a cup-shaped recess in its end, a hinged cap also having a cup-shaped recess and normally closing said discharge-opening and coöperating with said plunger to compress and form the ball, and means for intermittently operating said cap to uncover said discharge-opening to permit the completed ball to be ejected, substantially as described.

3. In a machine for making corn balls or cakes, the combination, with a barrel having corn receiving and discharge openings, of a reciprocating plunger, an auxiliary plunger carried thereby, a pivoted cap normally closing said discharge-opening and coöperating with said plunger to compress and form the ball, means for intermittently operating said cap to uncover said discharge-opening and permit the ball to be ejected, and pivoted means for operating said auxiliary plunger to disengage the completed ball from the plunger proper, substantially as described.

4. In a machine for making corn-balls, the combination, with a barrel having corn receiving and discharge openings, of a reciprocating plunger having a cup-shaped recess in its end, an auxiliary plunger operating through the bottom of said recess, means for actuating said auxiliary plunger to disengage the ball from the plunger proper when it begins its return stroke, a pivoted cap normally closing said discharge-opening, and coöperating with said plunger to compress and form the ball, and means for intermittently operating said cap to uncover said discharge-opening and allow the ball to be ejected, substantially as described.

5. In a machine for making corn-balls, the combination, with a barrel having corn receiving and discharge openings, of a reciprocating plunger having a cup-shaped recess in its end, an auxiliary plunger operating through the bottom of said recess, means for operating said auxiliary plunger when the plunger proper has completed its inward stroke, a swinging cap having a cup-shaped recess to normally close said discharge-opening and coöperating with said plunger to compress and form the ball, a discharging-plunger carried by said cap, means pivoted on a different center from said cap for actuating said plunger when the cap is being moved to uncover the discharge-opening, and means for intermittently operating said cap to uncover said opening and permit the ejectment of the corn-ball, substantially as described.

6. In a machine for making corn-balls, the combination, with a barrel having corn receiving and discharge openings, of a reciprocating plunger, a hinged cap normally closing said discharge-opening and coöperating with said plunger to compress and form the ball, means for locking said cap when closed, and means for intermittently opening said cap to uncover said discharge-opening and permit the completed ball to be ejected, substantially as described.

7. In a machine for making corn balls or cakes, the combination, with a barrel having receiving and discharge openings, of a feed-belt adapted to deliver the mixed corn and molasses to said barrel, a plunger reciprocating within said barrel, a cap or cover normally closing said discharge-opening and coöperating with said plunger to mold and compress the corn, means for operating said plunger, and means for intermittently operating said cap to uncover said discharge-opening and permit the ejectment of a completed ball, substantially as described.

8. In a machine for making corn-balls, the combination, with a molding and compressing chamber, of a reciprocating plunger operating therein, said chamber having receiving and discharge openings, a feed-belt adapted to deliver the mixed corn and molasses to said chamber, means for closing said discharge-opening and coöperating with said plunger to form and compress the ball, auxiliary relieving-plungers provided in said plunger proper and said closing means, and means for intermittently operating said closing means to uncover said discharge-opening and permit the ejectment of a completed ball, substantially as described.

9. In a machine for making corn-balls, the combination, with a barrel having receiving and discharge openings, of a reciprocating plunger therein, a cap normally closing said discharge-opening, auxiliary relieving-plungers provided in said plunger proper and in said cap, a fly-wheel having cam-grooves on its faces, a pitman connecting said plunger and said fly-wheel, and operative connections provided between said auxiliary plungers respectively and said cam-grooves, whereby when the plunger proper has nearly completed its stroke and said cap is operated to open the discharge-opening said auxiliary plungers will be actuated to eject the completed ball, substantially as described.

10. The combination, with a barrel, of a plunger reciprocating therein, an auxiliary plunger 32 provided within said plunger proper and operating lengthwise of the same, an arm 35 provided on said auxiliary plunger, an antifriction-roller 36, a fly-wheel, a pitman connecting said wheel and said plunger proper, and a cam-groove provided on said wheel in position to engage said antifriction-roller at a certain predetermined point in the revolution of said wheel, substantially as described.

11. In a machine of the class described, the combination, with a barrel having receiving and discharge openings, of a cap pivoted over said discharge-opening, a U-shaped rod 41 slidably connected with said cap and adapted to lock the same in its closed position, means for actuating said rod to unlock said cap and open the same to uncover said discharge-opening, substantially as described.

12. In a machine of the class described, the combination, with a molding and compressing chamber having a discharge-opening, of a pivoted cap normally closing said opening, an auxiliary plunger carried by said cap, a U-shaped rod 54 whereon said plunger is supported, a U-shaped rod 41 slidably connected with said cap and having a common pivot with said rod 54, and means for actuating said rod 41 to operate said cap and uncover said discharge-opening, substantially as described.

13. In a machine of the class described, the combination, with a barrel having receiving and discharge openings, of a pivoted cap having a cup-shaped recess normally closing said discharge-opening, a relieving-plunger operating through the bottom of said cup-shaped recess, a U-shaped rod 54 whereon said plunger is mounted, a U-shaped rod 41 slidable in a curved slot in said cap and having common pivots with said rod 54, means for operating said rod 41 to open said cap and uncover said discharge-opening, the pivots of said cap and said U-shaped rods being on different centers, whereby as said cap is swung open said plunger will be actuated to eject the ball from said recess, substantially as described.

14. In a machine of the class described, the combination, with a molding and compressing chamber, of a hopper having a discharge-opening communicating with said chamber, a feed-belt provided in the bottom of said hopper and adapted to deliver the mixed corn and cooked molasses to said opening, and a blade provided near said opening and adapted to scrape over the surface of said belt, for the purpose specified.

15. In a machine for making corn-balls, the combination, with a barrel having corn receiving and discharge openings, of a reciprocating plunger, a hinged cap normally closing said discharge-opening and coöperating with said plunger to compress and form the ball, an auxiliary plunger provided in said cap, means pivoted on a different center from said cap for operating said auxiliary plunger, and means for intermittently operating said cap, substantially as described and for the purpose specified.

16. In a machine for making corn-balls, the combination, with a barrel having receiving and discharge openings, of a reciprocating plunger thereon, a pivoted cap normally closing said discharge-opening, auxiliary relieving-plungers provided in said plunger proper and in said cap, means for operating the auxiliary plunger in said plunger proper when it is near the limit of its movement, means pivoted on a different center from said cap for operating this auxiliary plunger while said cap is being swung open, and means for intermittently operating said cap, substantially as described.

17. In a machine of the class described, the combination, with a barrel having receiving and discharge openings, of a cap hinged at its upper side over said discharge-opening, means for locking said cap in its closed position, and means for intermittently operating said locking means to unlock said cap and open the same, substantially as described.

18. In a machine of the class described, the combination, with a barrel having receiving and discharge openings, of a feed-belt for delivering the mixed corn and molasses to said barrel, a cap hinged over said discharge-opening, a reciprocating plunger operating within said barrel and coöperating with said cap to form the ball, auxiliary relieving-plungers provided in connection with said reciprocating plunger and said cap, and means for locking the said cap during the formation of the ball and unlocking the same to discharge the completed ball, substantially as described.

19. In a machine of the class described, the combination, with a hopper, of a feed-belt operating in the bottom of the same, a molding-barrel having a discharge-opening and communicating with said hopper and into which the mixed corn and molasses is fed by said belt, and means coöperating within said barrel to compress and form the corn-ball, substantially as described.

20. In a machine of the class described, the combination, with a hopper, of a feed-belt operating in the bottom of the same, a molding-barrel having a discharge-opening and communicating with said hopper and into which the mixed corn and molasses is fed by said belt, a hinged cap normally closing the discharge-opening in said barrel, and a reciprocating plunger coöperating with said cap to form the corn-balls, substantially as described.

21. In a machine for making corn-balls, the combination, with a hopper, of a feed-belt operating in the bottom of the same, a molding-barrel having a discharge-opening and communicating with said hopper and into which the mixed corn and molasses is fed by said belt, a hinged cap normally closing said discharge-opening, a reciprocating plunger cooperating with said cap to form the corn-ball, and auxiliary and relieving plungers provided in connection with said cap and reciprocating plunger, substantially as described and for the purpose specified.

In witness whereof we have hereunto set our hands this 15th day of July, 1901.
   CRAIG L. TILDEN.
   EDWARD J. BENDER.

In presence of—
 RICHARD PAUL,
 M. C. NOONAN.